United States Patent [19]

Eklund et al.

[11] Patent Number: 4,468,273

[45] Date of Patent: Aug. 28, 1984

[54] METHOD OF FLUID PRESSURE LAMINATING ASSEMBLED WOOD SEGMENTS TO FORM WOOD POLES

[75] Inventors: Tore Eklund, Ekshärad; Torbjörn Schmidt, Sollentuna, both of Sweden

[73] Assignee: NYA Värmlands Limträ Aktiebolag, Ekshärad, Sweden

[21] Appl. No.: 444,597

[22] PCT Filed: Dec. 30, 1981

[86] PCT No.: PCT/SE81/00398

§ 371 Date: Nov. 19, 1982

§ 102(e) Date: Nov. 19, 1982

[87] PCT Pub. No.: WO82/03240

PCT Pub. Date: Sep. 30, 1982

[30] Foreign Application Priority Data

Mar. 20, 1981 [SE] Sweden ................................ 8101769

Nov. 11, 1981 [SE] Sweden ................................ 8106678

[51] Int. Cl.[3] ........................ B27G 11/00; B32B 31/20

[52] U.S. Cl. .................................... 156/286; 144/347; 144/352; 144/354; 156/264; 156/293; 156/295; 156/304.2; 156/497

[58] Field of Search ............... 156/258, 264, 285, 287, 156/293, 294, 295, 304.2, 382, 211, 286, 69, 497; 144/346, 347, 350, 352, 354; 285/DIG. 16, 294, 297

[56] References Cited

U.S. PATENT DOCUMENTS

| | | | |
|---|---|---|---|
| 589,836 | 9/1897 | Koll | 144/352 |
| 730,789 | 6/1903 | Neill | 144/347 |
| 2,342,988 | 2/1944 | Vidal | 156/285 |
| 2,365,754 | 12/1944 | Gramelspacher | 156/258 |
| 2,385,544 | 9/1945 | Salisbury | 156/382 |
| 3,224,851 | 12/1965 | Hicks | 156/285 |
| 3,916,502 | 11/1975 | Bagnulo | 285/294 |
| 4,111,247 | 9/1978 | Hasenwinkle | 144/350 |
| 4,394,409 | 7/1983 | Hertel | 144/346 |

*Primary Examiner*—Jerome W. Massie

*Attorney, Agent, or Firm*—Murray, Whisenhunt and Ferguson

[57] ABSTRACT

In the manufacturing of wood poles a number of sections are glued together along abutting side surfaces (7, 8) so that a tubular pole (19) with a central cavity is formed. The side surfaces (7, 8) which have been provided with glue are brought into intimate contact with each other so as to give a tube (19). Sealing covers (20, 21) of the lika are placed at both ends of the tube so that these are sealed, whereafter air is pumped out from the central cavity (23) through one or both of the said covers so as to give a vacuum in the cavity in comparison with the external pressure, whereby the contact pressure between the abutting side surfaces increases. The vacuum is maintained until the glued joints (31) have been fixed.

8 Claims, 6 Drawing Figures

METHOD OF FLUID PRESSURE LAMINATING ASSEMBLED WOOD SEGMENTS TO FORM WOOD POLES

TECHNICAL SCOPE

The invention relates to a method for manufacturing wood poles consisting of a number of sections which are glued together along abutting side surfaces so that a tubular pole with central cavity is formed. Poles of this type can be used primarily as power line poles but also as masts of various types, columns for buildings, bridges etc.

BACKGROUND OF THE INVENTION

For many years power lines have been constructed using natural poles made from pressure-impregnated pine. Because of developments in modern forestry however there has been a drastic reduction in the availability of full-grown timber and hence also of natural poles having the requisite dimensions. Because of this poles of glued timer have been developed which are designed to replace natural poles. Examples of such designs are shown in DE No. 665 210, GB No. 745 540, FR No. 2 348 345 and WO No. 80/02709.

In spite of the urgent demand for glued poles and in spite of the fact that a plurality of glued pole designs have been produced in past years, the tubular glued timber pole has not as yet however been widely employed for power lines and similar demanding applications. One reason for this is that from the production viewpoint these poles give rise to a number of problems which have not been satisfactorily solved using available techniques. These problems concern both the jointing and the gluing of the individual sections, also the requisite impregnation of the glued construction.

DESCRIPTION OF THE INVENTION

The aim of the invention is to solve the above-mentioned problem in providing initially a method for facilitating the jointing and gluing of the sections. Hence in accordance with the present invention it is proposed that glue be applied to the side faces which are to be joined together, that the side faces provided with glue be brought into intimate contact with each other so that a tube is obtained, that sealing covers or the like are applied at both ends of the tube so that this is sealed (instead of covers it is naturally possible to envisage plugs of various types), that air is pumped out of the central cavity through one or both of the said covers or the like, thus giving a vacuum in the cavity in relation to the external pressure, whereby the contact pressure between the abutting side faces increases, and that the vacuum is maintained until these glued joints have become fixed. Possibly the outside of the tube is also subjected to an overpressure in comparison with the surrounding pressure, whereby the contact pressure between the abutting side edges is further increased.

Because in accordance with the invention the air is pumped out so that the pressure drops in the pole, the boiling point of the glue also drops if the glued joint is in communication with the cavity. To prevent this a barrier is applied appropriately between the cavity and the glued joint. This barrier can for example consist of a thin extended sealing strip or a metal wire between the two abutting side faces near the inside of the tube. Preferably however, in accordance with one embodiment of the invention, the barrier is obtained by providing at least one of the two side faces with a slight projection—a mini-tongue—which extends along one side face immediately inside the inner face of the tube. During assembly the mini-tongue is partially pressed into the abutting side surface so that a complete seal is obtained. By this means the risk of boiling because of pressure reduction can be eliminated even if the pole is heated, which as such as favourable in order to accelerate the curing of the glue.

The individual sections are preferably given a trapezoidal shape, which as such is known. To facilitate jointing in accordance with the invention the side faces are preferably provided with round tongues and grooves which both from the viewpoint of production technique and for jointing the sections together is considerably more favourable than previously proposed tongue and groove shapes. To facilitate effect impregnation and to adapt the construction to suit the crack formation tendency of the timber, the individual sections are appropriately made up of 2–4 pieces of timber layers glued together with the sapwood facing the base in the trapezoidal sections.

Further characteristics and advantages of the invention are outlined in the patent claims and are illustrated by the following description of a preferred embodiment.

BRIEF DESCRIPTION OF DRAWINGS

In the following description of a preferred embodiment reference will be made to the appended drawings in which FIG. 1 gives a perspective view of a section of the type from which the pole is to be manufactured in accordance with the invention.

DESCRIPTION OF PREFERRED EMBODIMENT

Figure 1:
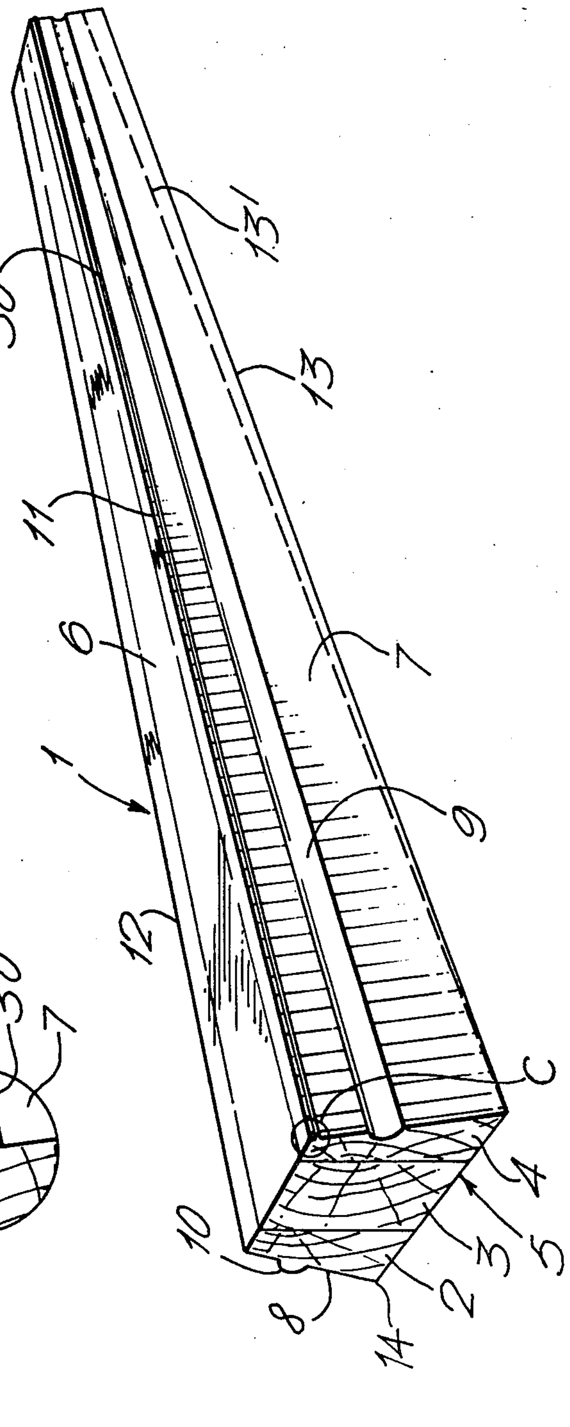
FIG. 1*a* shows an enlarge view of the portion contained in circle C shown in FIG. 1.
Figure 1A:
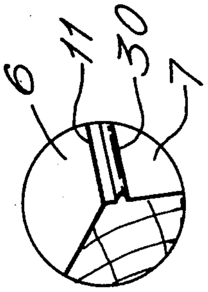

With reference initially to FIG. 1, a section for manufacture of the pole in accordance with the invention is generally designated as 1. The section 1 has a profile shaped like an isosceles parallel trapezoid and is made up of three glued laminations 2, 3 and 4. The base surface of the section is designed as 5, its top surfaces as 6 and its two side surfaces as 7 and 8. The two side surfaces 7 and 8 are provided with tongues and grooves in the form of grooves 9 and tongues 10. During assembly the sections 1 are arranged so that the side faces 7 on adjacent sections are placed against each other, whereby the tongues 10 fit into the grooves 9. The base surfaces 5 form the outside and the top surfaces 6 form the inside of the finished pole. The tongue and groove 9, 10 are parallel with the edge lines 11, 12 between the side surfaces 7, 8 and the top surface 6. In accordance with the embodiment illustrated the section 1 is absolutely uniform, i.e. has the same cross sectional area along its entire length, so that the tongue and groove 9, 10 are also parallel with the lower edge lines 13, 14, but it is also possible to plane the base surface 5 so that the section 1 tapers. This has been indicated by the dashed line 13' which in this case is not parallel with the tongue and groove 9, 10. The three laminations 2, 3, and 4 are further sawn and laid in such a way that the sapwood faces towards the base surfaces 5, i.e. towards the outside in the finished pole. The laminations 2, 3 and 4 are furthermore composed appropriately, in a manner which forms part of the state of the art, of finger-jointed sections, so that the desired length can always be obtained. FIG. 1 shows also that the tongue and groove 9, 10 is placed considerably closer to the edge lines 11, 12 than to the edge lines 13, 14 so that the base surface 5 can be planed down, if so required, without cutting the tongue and groove at the narrowest end.

Figure 6:
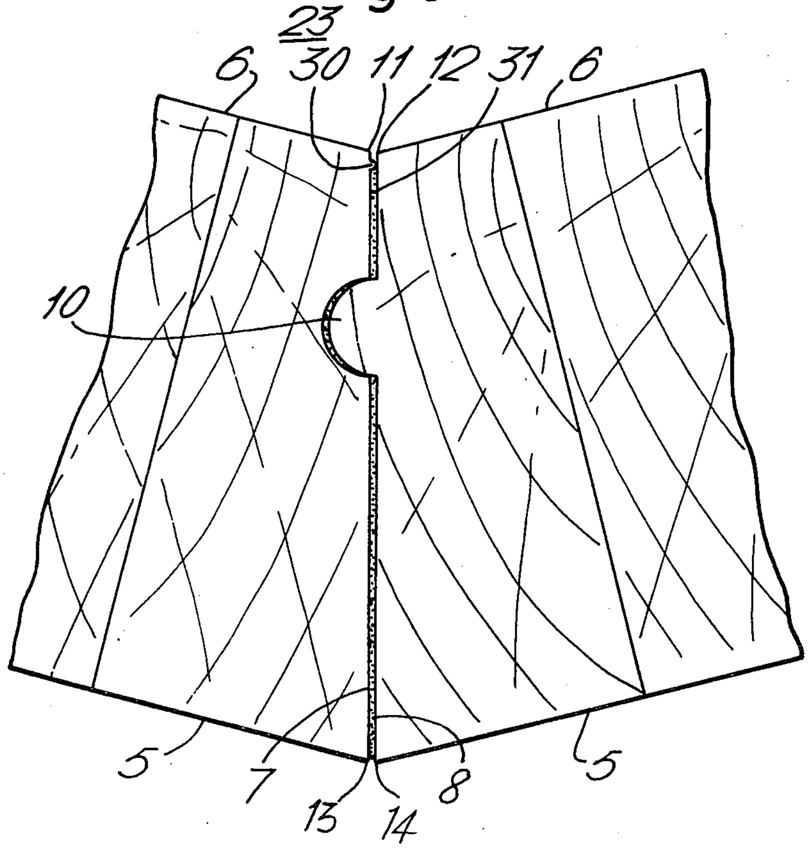
FIG. 6 illustrates the conditions prevailing in the glued joint.

About 2 mm from the edge line 12 the side surface 8 is also provided with a small projection in the form of a "mini-tongue" 30 which extends along the entire length of section 1. The mini-tongue 30 is about 1 mm wide and ½ to 1 mm in height. Its function is to provide a seal for the glue in the glued joints 31, FIG. 6, so that the glued joint cannot communicate with the cavity 23. In FIG. 6 the thickness of the glued joint 31 has been exaggerated for the sake of clarity.

Figure 2:
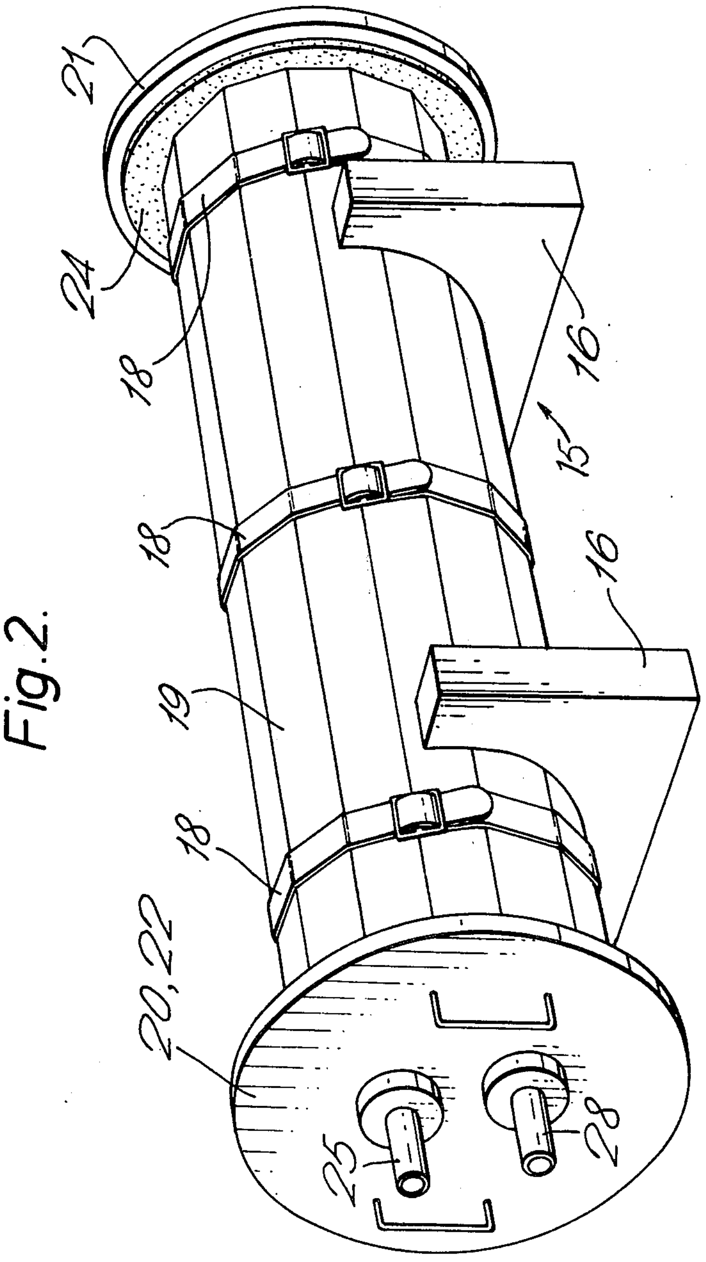
FIG. 2 gives a perspective view which illustrates pole manufacture.
Figure 3:
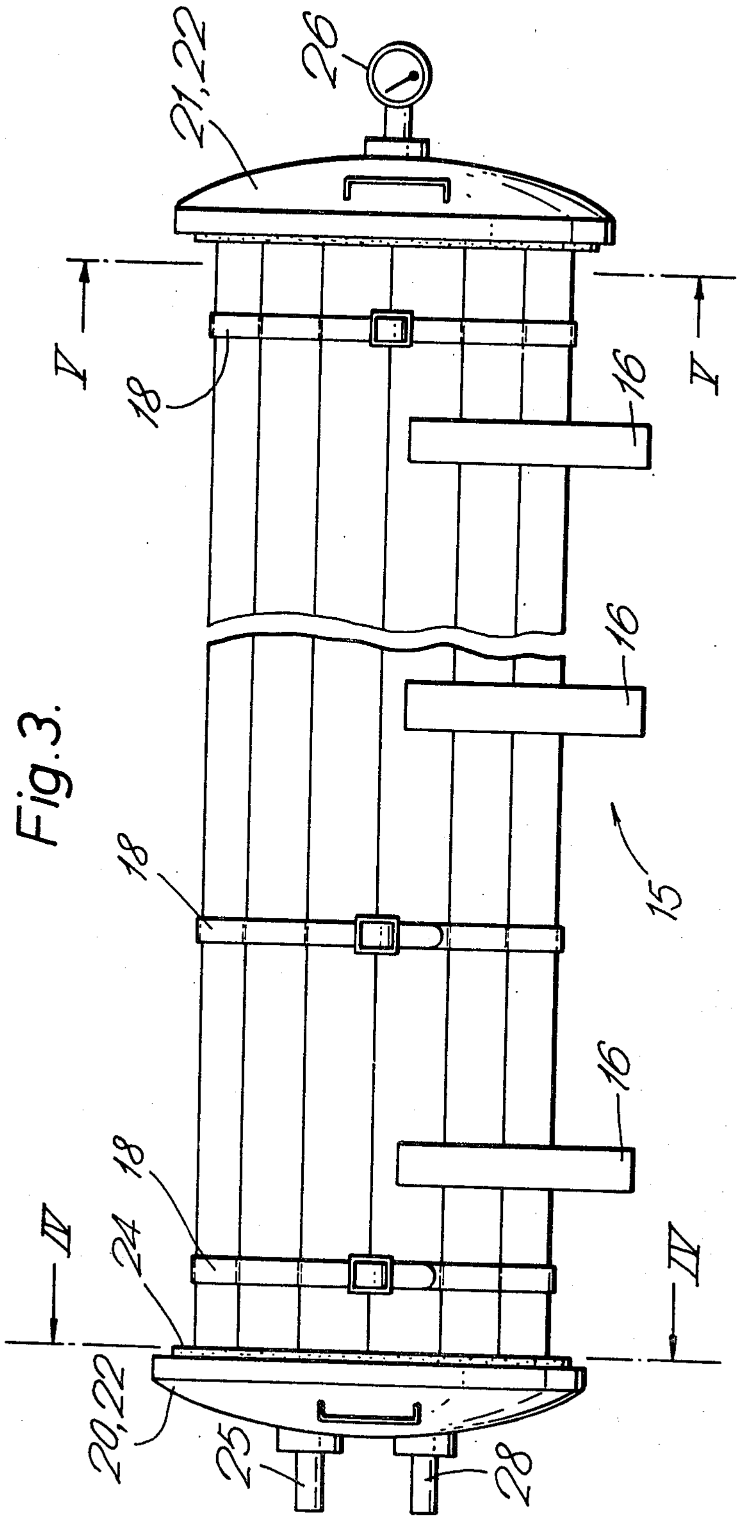
FIG. 3 illustrates the same feature, in side view.
Figure 4:
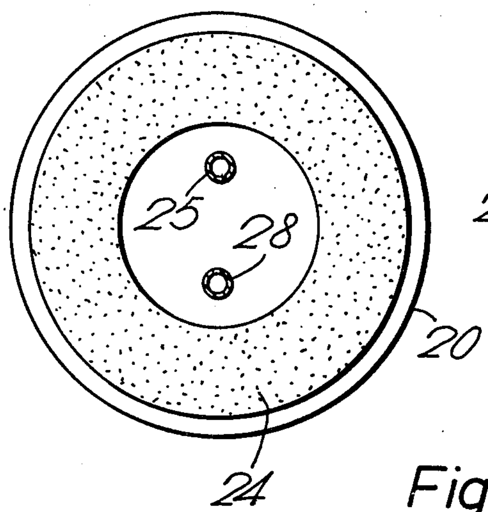
FIG. 4 gives a section IV—IV in FIG. 3.
Figure 5:
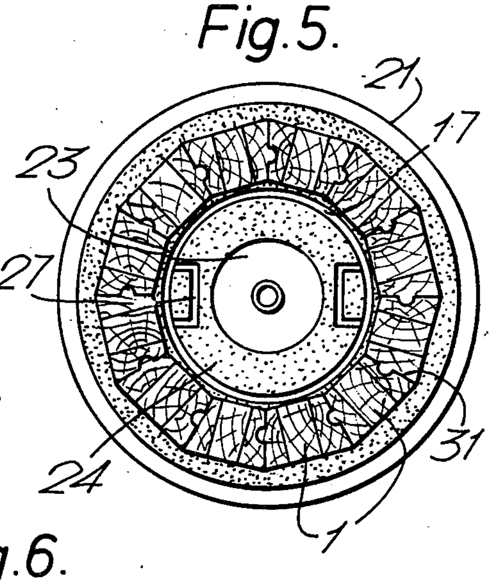
FIG. 5 shows a section V—V in FIG. 3.

During jointing the side surfaces 7 and 8 are provided with glue and are then placed in a fixture 15, FIG. 2 and FIG. 3, with semicircular-shaped support 16. First of all a number of sections 1 are placed in this support 16, the sections being orientated with respect to each other in the desired manner by means of the round tongues and grooves 9, 10. Then a vertical ring 17 is placed at both ends, after which the layer is completed by adding further sections 1. Some straps 18 are then wound around the whole assembly and tightened so that the side faces 7, 8 are pressed firmly against each other. The two ends of the tube 19 thus formed are cut off so that the end faces are absolutely even, after which the ends are sealed by a pair of covers 20 and 21.

The covers 20, 21 consist of plates 22, the outsides of which are domed so that they can withstand an external overpressure relative to the central cavity 23 of the tube 19. On the inside the covers 20, 21 are absolutely flush and provided with a ringshaped fairly wide rubber packing 24. One cover 20 is provided with an extraction pipe 25 which is connected with the cavity 23, whilst the other cover 21 is provided in a corresponding manner with a manometer 26 for measuring the pressure in the cavity 23. Thus when the covers 20, 21 with packings 24 have been placed against both ends of the tube 19 and are pressed against the ends at a certain pressure, the air in the cavity 23 is pumped out through the pipeline 25. Until the vacuum produced in the cavity 23 is so great that the covers 20, 21 are sucked firmly in place, the covers 20, 21 can be held in position manually. The pumping out of the air then continues until the pressure in the cavity 23 has dropped to the desired level, appropriately to about 0.1 kp/cm$^2$. Subsequently this same pressure difference is maintained between the pressure in the cavity 23 and the surrounding pressure until the glued joints 31 in the tube 19 have become fixed.

During the assembly of the sections the mini-tongues 30 are pressed against the opposing side face 7 and to some extent are also pressed into this. Hence the tongues 30 function as a seal which effectively cuts off the glue in the glued joint 31 from the cavity 23. When the air is pumped out of the cavity 23, the glue in the glued joints 31 is consequently not sucked into the cacity 23 and the glue does not start to boil because of the pressure reduction in the cavity 23.

When the glue in the glued joints 31 has hardened so that the joints have become fixed, the straps 18 are removed together with the covers 20, 21 and the supporting rings 17. For this purpose the latter can be provided with a pair of clamps 27. The pole 19 can then be transferred to store for subsequent curing. Finally the pole 19 is impregnated with creosote oil both from the outside and from the inside in a known manner. As the sapwood faces the outside of the pole and the grain is orientated in the manner indicated in the diagrams, this greatly facilitates the penetration of the impregnation agent.

To increase the gluing pressure it is feasible and possible in accordance with the invention to subject the outside of the pole 19 to an overpressure, whilst at the same time a vacuum is produced in the cavity 23. The entire structure illustrated in FIG. 2 and FIG. 3 is then placed in a pressure vessel in which a positive pressure is brought about by means of compressors, whilst the air is simultaneously pumped out through the pipe 25. To shorten the gluing time it is also possible to heat up the residual air in the cavity 23. For this purpose a further connecting pipe 28 can be provided so that hot air is made to circulate through the cavity 23 so that the pole is heated up from the inside before the air is pumped out. Even whilst the vacuum is maintained in the cavity 23, it is possible to allow certain quantities of hot air to circulate within the cavity. If a positive pressure is also applied to the outside, it is possible in the same way to heat the air in the pressure vessel so as to obtain a temperature rise also from the outside with a view to shortening the gluing time. Whilst the glue is curing, the pressure in the cavity is checked continuously so that it is maintained at the desired level.

The gluing pressure for vacuum gluing in accordance with the invention, possibly combined with positive pressure treatment, is calculated as follows:

$$(t \cdot D)/(2 \cdot m) = T,$$

where t = vacuum + possible overpressure, kp/cm$^2$

D = external diameter of tubular pole, cm m = gluing pressure, kp/cm$^2$, in glued joint 31

The dimensions of the pole can be varied within wide limits. For practical reasons the upper limit can be taken as 40 m, whilst a lower economic limit is about 0.5 m. The external diameter can also be varied within wide limits. For efficient handling only a restricted number of dimensions for the sections 1 should be employed. But even with a very restricted number of sections sizes the external diameter can be varied between circa 350 and 1,300 mm, which gives a wall thickness range between circa 50 and circa 225 mm.

For manufacturing it is best to use a glue which is made and marketed by the Norwegian company Dyno A/S under the tradename Dynosol S 204, together with the hardener recommended for this Dynosol H 627 which requires a gluing pressure of cirka 2.0 kp/cm$^2$. With the method in accordance with the invention this gluing pressure can be achieved for all the demensions encountered in practice without it being necessary to apply a positive pressure.

If the vacuum amounts to 0.9 kp/cm$^2$ (0.1 atmospheres gauge) in an assumed example where D = 48 cm and m = 9 cm the following gluing pressure is obtained:

$$D = (0.9 \cdot 48)/(2 \cdot 9) = 2.4 \text{ kp/cm}^2$$

We claim:

1. Method for manufacturing wood poles consisting of a number of sections glued together along abutting side faces so as to form a tubular pole with a central cavity, said method comprising:

providing a number of sections having a trapezoidal shape, each of said sections having side faces abuttable with side faces of other said sections;

providing said side faces with glue to give glue-bearing side faces, and bringing said glue-bearing side faces into intimate contact with each other to give a tub in which said sections define a central cavity;

placing sealing means at both ends of said tube for sealing said ends of said tube;

pumping air out of said central cavity through one or both of said sealing means to give a vacuum in said central cavity in comparison to the external pressure so that contact pressure between abutting side faces increases;

maintaining said vacuum until glued joints are formed to hold said sections together.

2. A method as claimed in claim 1, wherein sealing devices are arranged between said central cavity and said glued joints so as to prevent communication between said central cavity and said glued joints while said glue is curing.

3. Method as claimed in claim 1, wherein said abuttable side faces are provided with circular tongues and grooves.

4. Method as claimed in claim 1, wherein the number of sections is more than 10.

5. Method as claimed in claim 1, wherein each of said sections is made up of 2–4 pieces of timber layers which are glued together with the sapwood facing a base of said trapezoidal shape.

6. Method as claimed in claim 1, wherein said tubular pole is subjected to an external positive pressure as compared with surrounding pressure, whereby said contact pressure between abutting side faces is further increased.

7. Method as claimed in claim 1, wherein said tube is heated during gluing of said sections together by hot air in said central cavity and/or by hot air externally of the tube.

8. Method for manufacturing wood poles consisting of sections glued together along abutting side surfaces so as to form a tubular pole with a central cavity, said method comprising:

providing a number of sections having a trapezoidal shape, each of said sections having side faces abuttable with side faces of other of said sections;

gluing said sections together along said side faces to give a tube with a central cavity;

placing sealing means at both ends of said tube for sealing said ends of said tube;

pumping air out of said central cavity through one or both of said sealing means to generate a reduced pressure in said tube, whereby contact pressure between abutting side surfaces increases;

maintaining said reduced pressure until glued joints are formed to hold said sections together.

* * * * *